Patented Aug. 8, 1944

2,355,061

UNITED STATES PATENT OFFICE 2,355,061

TURPENTINE COMPOSITION AND METHOD OF MAKING

Joseph Eichberg, Great Neck, N. Y., assignor to American Lecithin Company, Cleveland, Ohio, a corporation of Ohio No Drawing. Application July 6, 1942, Serial No. 449,959

8 Claims. (Cl. 106—271)

This invention relates to turpentine and turpentine products and to the method of preparing the same.

One object of my invention is to facilitate the preparation of turpentine free from objectionable appearance.

Another object is to reduce the cloudiness exhibited by or developing in some batches of turpentine. This cloudiness may become apparent after manufacture and may render the product unsalable.

Still another object of my invention is to render the turpentine products less sensitive to changes in temperature or moisture conditions.

A further object is to improve the utility of turpentine products and of mixtures containing the same.

In accordance with my invention I treat turpentine or turpentine products such as polymerized turpentine by adding a small percentage of phosphatide. I have found that the phosphatide dissolves in the turpentine and that even a fraction of 1% of phosphatide not only improves the resistance to turbidity but also exerts a marked clarifying action on turpentine which has already developed cloudiness.

Example 1

Soybean phosphatides in amounts of .005, .01, .05, .06, .07, .1 and .15% by weight were added to cloudy turpentine. With each concentration of phosphatide the turpentine was found to have cleared gradually over a period of three days, except for a trace of sediment at the bottom of the containers; the sample of turpentine without lecithin was cloudy throughout the container. Duplicate samples were prepared and kept in a dark cupboard, the same results being obtained.

Example 2

Two samples of clear polymerized turpentine were placed in 4 oz. jars and to one was added 1% by weight of soybean phosphatides. After standing for several days at room temperature the untreated sample was found to be cloudy and to contain sediment; the sample containing the phosphatide was brilliantly clear and was free from sediment. Examination one week later showed no change in the treated sample.

Example 3

To samples of a cloudy polymerized turpentine were incorporated 0.5% and 0.1% of a soybean lecithin product. This commercial lecithin contains about equal amounts of cephalin and lecithin, the phosphatides being associated with a carrier of about 30% oil by weight of the total. The samples were turbid when the lecithin was added and after incorporation the sample containing the smaller percentage of lecithin appeared to be a little more turbid. The samples became gradually clearer and at the end of two days the sample with 0.5% was brilliantly clear and free from sediment and that with 0.1% was slightly turbid and contained a trace of sediment. At the end of four days the sample with 0.1% had also become brilliantly clear and free from sediment. The untreated control sample remained turbid and contained considerable sediment.

Phosphatides that have been bleached according to known methods may be used in cases where it is desired to produce a very light colored composition.

I have furthermore found that turpentine made in accordance with my invention possesses improved properties for use in preparing paste products such as shoe polish or wax for application to wood, etc., and that such pastes are of superior quality.

Example 4

One per cent of phosphatide was incorporated in a black shoe polish made with turpentine. Comparisons were made with a control sample containing no phosphatide and it was found that the polish with the phosphatide set with a better gloss, gave a longer lasting shine, made the leather more resistant to water due probably to better penetration, counteracted fading of the dye and the polish itself did not harden as readily on standing.

Example 5

A sample of furniture wax made with turpentine was treated with 0.25% of soybean phosphatide by melting the wax and after incorporation pouring the wax at 55° C. and allowing to set. Compared with wax containing no phosphatide but otherwise treated in the same way it was observed that the phosphatide containing wax had a better gloss, acquired a higher degree of brilliancy on polishing, spread easier, had a better color when set and was free from cracks.

Since it is clear that various modifications may be made in the specific details above set forth, the invention is not restricted thereto except as defined in the appended claims.

I claim:

1. The method of improving a composition of matter comprising a terpenic material selected from the class consisting of turpentine and liquid polymerized turpentine, which comprises adding from about 0.005% up to 1% of phosphatide by weight of the terpenic material to the composition in a liquid state.

2. The method of improving the resistance of a terpenic material selected from the class consisting of turpentine and liquid, polymerized turpentine to cloud formation consisting in adding from about 0.005% to about 1% of phosphatide, the amount of phosphatide being calculated on the weight of the terpenic materials.

3. The method of clarifying cloudy terpenic material selected from the class consisting of turpentine and liquid polymerized turpentine characterized by incorporating from .005% to 1% of phosphatide and allowing the phosphatide to remain in the turpentine or turpentine product for at least two to three days.

4. A composition of matter comprising a terpenic material selected from the class consisting of turpentine and liquid, polymerized turpentine, and from about 0.005% up to about 1% of phosphatide by weight of said terpenic material.

5. A composition of matter comprising a terpenic material selected from the class consisting of turpentine and liquid, polymerized turpentine, and from about 0.005% up to 1% of soybean lecithin by weight of the terpenic material.

6. Turpentine containing .005% to 1% of phosphatide.

7. Liquid, polymerized turpentine containing .005% to 1% of phosphatide.

8. A composition of matter comprising a wax, a terpenic material selected from the class consisting of turpentine and liquid, polymerized turpentine, and from 0.005 to 1% of phosphatide by weight of said terpenic material.

JOSEPH EICHBERG.